United States Patent [19]

Pear, Jr.

[11] 3,727,002

[45] Apr. 10, 1973

[54] MAGNETIC METHOD FOR DIGITALLY IDENTIFYING THE LOCATION OF AN APPLIED FORCE

[75] Inventor: Charles B. Pear, Jr., Greenlawn, N.Y.

[73] Assignee: Potter Instrument Company, Inc., Plainview, N.Y.

[22] Filed: Mar. 29, 1971

[21] Appl. No.: 128,934

[52] U.S. Cl. ....................178/18

[51] Int. Cl. ....................G08c 21/00

[58] Field of Search....................178/18, 19, 20, ; 340/146.3 MA, 146.3 SY, 166 C, 166 FE, 174 MA, 174 MS, 174 R, 146.3 C, 166 CE, 146, 166; 73/141 A

[56] References Cited

UNITED STATES PATENTS

| | | | |
|---|---|---|---|
| 3,648,277 | 3/1972 | Whetstone | 178/18 |
| 3,657,475 | 4/1972 | Peronneau | 178/18 |
| R26,739 | 12/1969 | Stucki | 73/141 A |
| 3,453,876 | 7/1969 | Radus | 73/141 A |
| 3,469,242 | 9/1969 | Eachus et al. | 340/174 M |
| 3,624,619 | 11/1971 | Ambrosio | 178/18 |
| 3,530,437 | 9/1970 | Booker, Jr. et al. | 178/18 |

*Primary Examiner*—Kathleen H. Claffy
*Assistant Examiner*—Ken Richardson
*Attorney*—Lane, Aitken, Dunner & Ziems

[57] ABSTRACT

A method and apparatus for digitally identifying the location of an applied force by utilizing the changes in the properties of a magnetic material in response to the application of a force to the material. In one embodiment, a matrix of similarly-oriented magnetic cores is arranged so that the rows and columns of cores are sequentially driven by a driving signal from a core driver circuit. Sense lines are provided for both the rows and the columns of cores and are arranged so that the row sense lines thread a like number of cores in each row in each of a first direction and a second or opposite direction. The column sense lines are also located so that a like number of cores in each column are threaded in each of a first direction and a second direction. In the absence of a force applied to any one of the cores, the resultant sensed output from the column sense lines as the rows of cores are sequentially driven is substantially zero, since the sensed output produced by the cores threaded by the sense lines in one direction is cancelled by the sensed output produced by the cores threaded by the sense lines in a second direction. When a force is applied to a core, a signal is sensed by the column sense lines during the sequential driving of the rows of cores which cause a control circuit to actuate a counter to indicate the X-coordinate of the location of the force. Similarly, when the columns of cores are being driven, a signal is sensed by the row sense line during the sequential driving of the columns of cores which causes the control circuit to indicate a count on a Y-counter to indicate the Y-coordinate of the force. The respective coordinates thus indicate the location of the force. In an alternative embodiment, the column drive lines are used as sensing lines when the rows of cores are being sequentially driven, while the row drive lines are used as the sense lines when the columns of cores are sequentially driven. Circuit modifications to effect a reduction in the number of leads threading each core for the alternative embodiment are thus disclosed.

23 Claims, 5 Drawing Figures

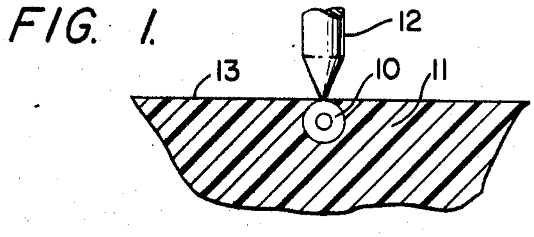
FIG. 2.
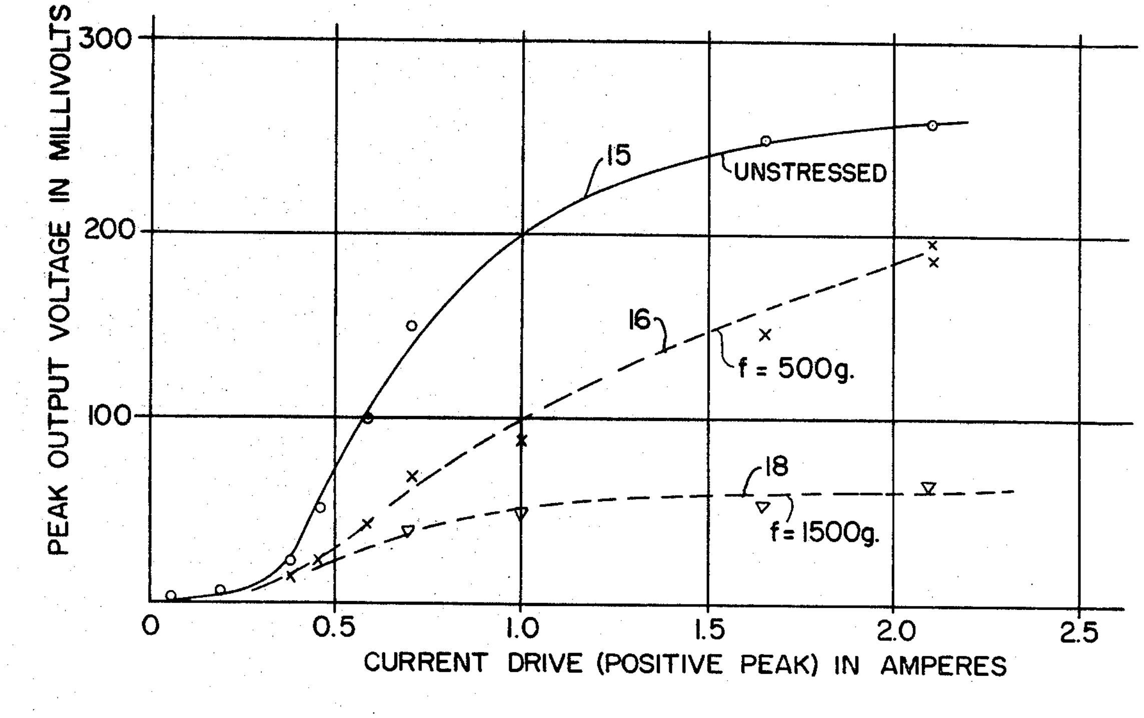
FIG. 5.
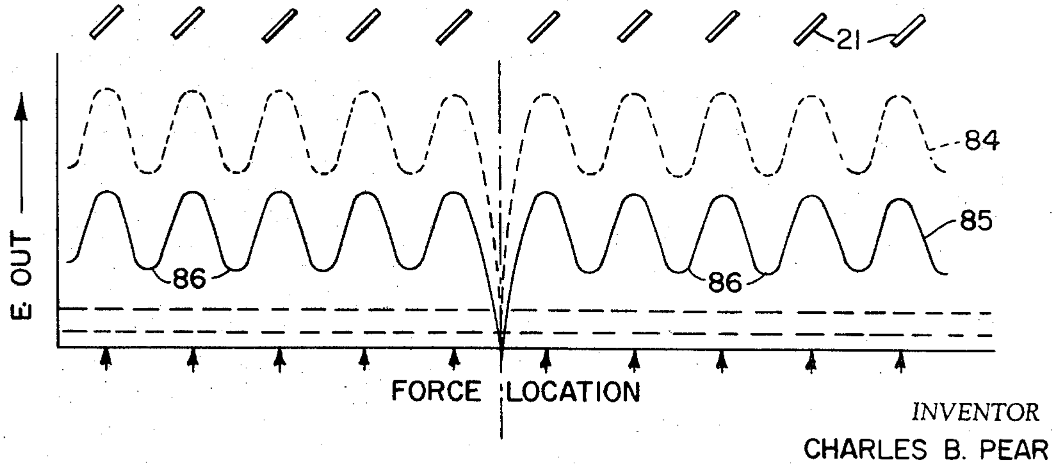
INVENTOR
CHARLES B. PEAR
BY
Lane, Aitken, Dunner & Ziems
ATTORNEYS

INVENTOR
CHARLES B. PEAR

BY *Lane, Aitken, Dunner & Ziems*
ATTORNEYS

INVENTOR
CHARLES B. PEAR

BY Lane, Aitken, Dunner & Ziems
ATTORNEYS

MAGNETIC METHOD FOR DIGITALLY IDENTIFYING THE LOCATION OF AN APPLIED FORCE

BACKGROUND OF THE INVENTION

This invention relates to a method and apparatus for digitally identifying the location of an applied force, More particularly, this invention relates to a method and apparatus for digitally identifying the location of an applied force by using the properties of the magnetic material which change as a result of a force applied to the magnetic material. Still more particularly, this invention relates to a method and apparatus for locating a force, produced for example by a stylus, applied to a matrix of magnetic cores.

It is known in the art that the coupling capability of a magnetic material can be influenced by an applied force. Such an effect, for example, is described in the text by Bozarth, Ferromagnetism, Page 603 et seq. which generally describes relatively large changes in the permeability of a magnetic material for relatively small applied forces. It is also well known in the art that the properties of square loop magnetic cores made of ferrite materials are changed by the application of external forces.

It is an aim of this invention to provide a method and apparatus which effectively utilize such properties, for example, to produce circuits for use as a keyboard in a data transfer system or for a number of other applications, such as producing a code generator, program control, or for following the movement of a stylus while writing on a surface in proximity to a core matrix. By way of example, there are a number of applications where it would be desirable to code digitally the sequence of positions of the stylus passing over a core matrix.

Thus, it is a primary object of this invention to provide a method and apparatus for utilizing the described properties of magnetic material to indicate the location of an applied force on a core matrix.

This and other objects of the invention will become apparent from a review of the detailed description of the invention which follows, taken in conjunction with the accompanying drawings.

BRIEF DESCRIPTION OF THE DRAWINGS

In the drawings:

FIG. 1 illustrates the application of a force from a stylus to a magnetic core encapsulated in a suitable material;

FIG. 2 shows a representative plot of the peak output voltage from the core of FIG. 1 as a function of the drive current to the core for several magnitudes of force applied to the core by the stylus;

FIG. 5 is a diagram of the output from the matrix as a function of the location of the force relative to the core.

BRIEF SUMMARY OF THE INVENTION

Figure 3:
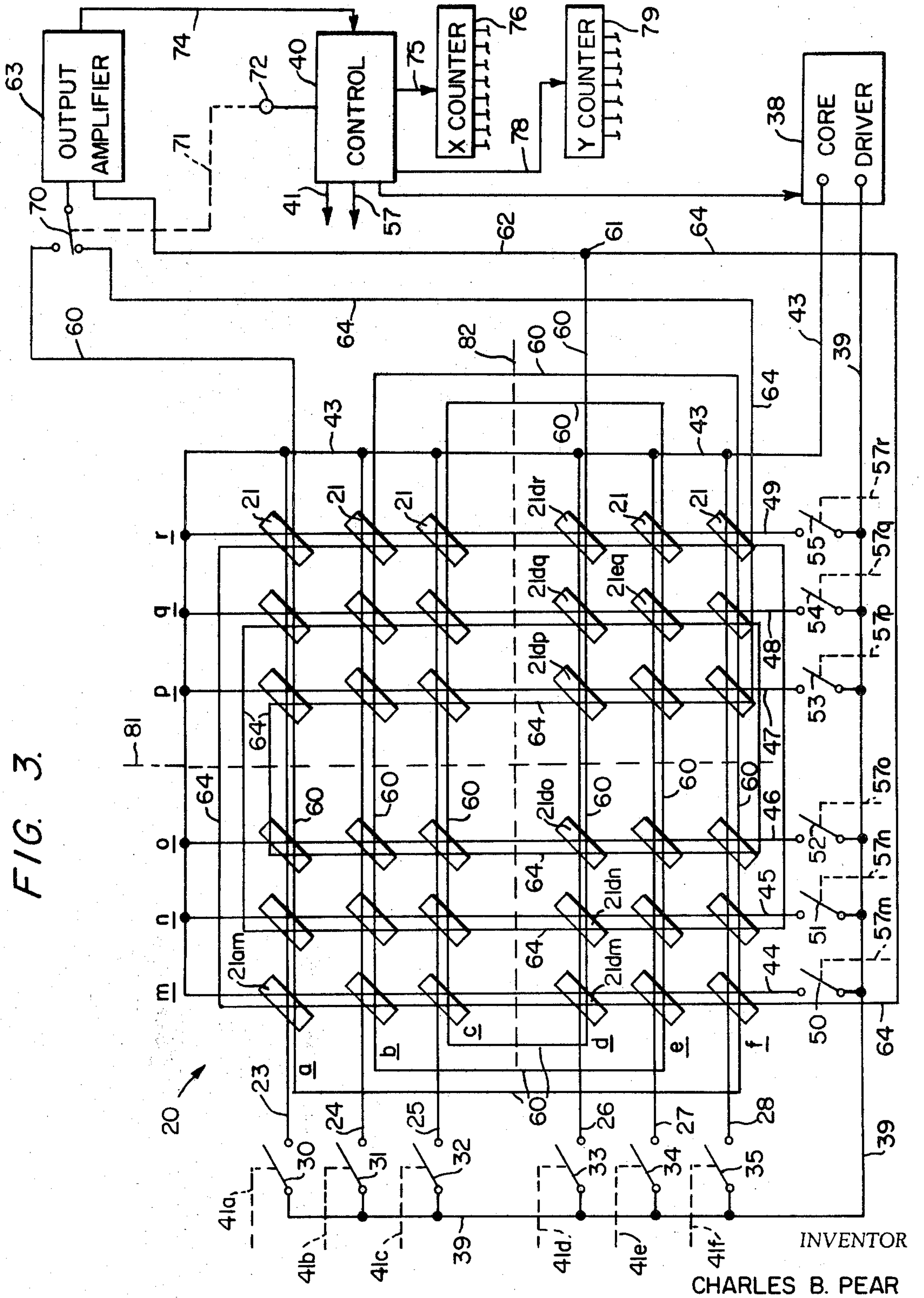
FIG. 3 is a circuit diagram, partially in block form, illustrating one embodiment of a circuit for practicing the invention.

Directed to providing a method and apparatus which effectively utilizes the change in the sense output from a driven core in response to a change in the force applied to the core, this invention relates to a method and apparatus for indicating both that a force is applied to a core and the location of the applied force. In one aspect of the invention, a neutralizing signal substantially equal in magnitude to the sensed signal produced by a driven core when influenced by a first force is provided in circuit with the sensed signal from the core so that the resultant output from the core is substantially zero. When a different force is applied to the driven core, a net sensed output signal is produced. An indicating circuit responsive to the net sensed output signal thus indicates that a force is applied to the core. In another aspect of the invention, the neutralizing signal is produced by the sensed output of a second driven core so that when substantially equal forces or no external forces are applied to each of the cores, a net sensed output signal having a substantially zero magnitude is produced. When an external force is applied to one of the cores, the indicating circuit indicates the location of the applied force. Preferably, the indicating circuit digitally codes the position of the applied force which may be produced, for example, by a stylus. In a preferred embodiment, the invention comprises a matrix of magnetic cores arranged in rows and columns. Each of the ores exhibits a change in a sensed output signal as a function of the force applied to the core. Means are provided for sequentially driving selected cores in the matrix, for example, each of the rows and columns of the matrix in sequence. Sensing means are provided for sensing the output signal of the driven cores which signal is responsive to the signal driving the cores. The sensing means are arranged so that when no external force is applied to the matrix, no net sensed output signal is produced by the driven cores. When a force is applied to one of the cores of the matrix, a net sensed output signal is produced. When the rows of cores are being driven, the indicating circuit responds to the net sensed output signal from the driven rows of cores to indicate the row of cores containing the core to which a force has been applied. When the columns of cores are being driven, the indicating circuit also responds to the net sensed output signal from the driven columns of cores to indicate the column containing the core to which the force has been applied. Thus, the location of the core is determined. Preferably, the indicating circuit digitally codes the location of the force, for example, by the use of row and column counting circuits wherein the counts shown by the counters locate the position of the applied force.

Specifically, for a matrix of cores thus described, each of the similarly-oriented cores in a row of cores is simultaneously driven by a drive signal. A sensing line threads a like number of cores in each of a first and second, or opposite direction. In the absence of an applied force, the sensed output signal produced by the cores in the driven row is substantially zero. When a force is applied to one of the driven cores, a net output signal from the driven row of cores produces an indication that the driven row contains the core to which a force is applied. Similarly, when a column of rows is being driven, a sensing lead threads a like number of cores in that column in each direction so that the column containing the core to which an external force is applied can be determined.

In a second embodiment, the drive line for a row of cores serves as a sensing line for a column of cores when driven and a drive line for a column of cores serves as the sensing line for a column of cores when driven.

A control circuit sequences the sequential driving of rows and columns of cores respectively and respectively actuates a row counter and a column counter when a net sensed output signal is received from the sensing circuit.

DETAILED DESCRIPTION OF THE PREFERRED EMBODIMENT

One aspect of the invention utilizes the phenomena that the coupling capabilities of a magnetic material are influenced by an applied force. In particular, the properties of a square-loop memory core made from ferrite materials are changed by external forces, such as by the application of a force from a stylus to or in proximity to a ferrite core. Thus, FIG. 1 is provided to illustrate an apparatus for producing that phenomenon. In FIG. 1, a ferrite core 10 is secured in a suitable encapsulating structure 11, such as in a resinous material, and a stylus 12 is used to apply a force either to the core 10 or in proximity thereto along the surface 13 of the encapsulating structure 11. A suitable encapsulating structure, for purposes of illustration, is an epoxy resin such as is commercially available under the designation "Scotchcast No. 8."

FIG. 2 is a graphical illustration of the peak output voltage in millivolts produced by a core 10 as a function of the current drive to the core in amperes for the illustration depicted in FIG. 1. Thus, the curve designated by the reference numeral 15 is a plot of the output voltage from the core against the current drive to the core when the core is in a neutral or an unstressed condition, such as when no external force is applied to the core.

The curve designated by the reference numeral 16 shows the peak output voltage from the core 10 plotted against the current drive in amperes applied to the core when a force of about 500 grams is applied to the core 10 by the stylus 12. The peak output voltage for the core 10 is a stressed condition, as demonstrated by the curve 16, is less than the output voltage from the same core in an unstressed condition, as demonstrated by the curve 15. The minimum output from the ferrite core 10 is obtained by further increasing the applied force, such as by applying a force of approximately 1,500 grams, a force produced, for example, by using a pencil point on the surface 13 of the encapsulating structure 11. When such a force is applied, the output from the core 10 provides a peak output voltage as demonstrated by the curve designated by the reference numeral 18. Thus, the curve 18 further demonstrates that increasing the force applied to the core causes the peak voltage produced by the core to decrease.

These phenomena may be used for such applications as a computer keyboard, a special code generator, a program control, or for following the movements of a stylus when writing upon the surface 13 or for determining the location of a force applied to or in proximity to a matrix of cores.

FIG. 3 shows a matrix of cores, designated generally by the reference numeral 20. The matrix 20 comprises a plurality of toroidal cores 21 arranged in an array. Each of the toroidal cores 21 is oriented in parallel with an adjacent core. The cores 21 in the matrix 20 are packed as close together as possible while yet permitting space for drive and sense lines to thread through the cores in substantially straight lines to simplify the assembly.

The rows of the toroidal cores 21 are designated by the letters *a* through *f* respectively while the columns of toroidal cores are designated generally by the letter *m* through *r*. Thus, for purposes of this specification, the toroidal cores may be designated with subscripts designating row and column of the particular toroidal core 21 referred to. For example, a toroidal core designated $\mathbf{21}_{am}$ refers to the core 21 which is in row *a*, column *m*, while the core $\mathbf{21}_{eq}$ refers to the core 21 in row *e*, column *q*.

A plurality of row drive lines 23–28 in circuit respectively with switches 30–35 respectively are provided for sequentially driving the rows of cores. As shown, all of the cores in a row of cores are driven at one time by closing the switch in circuit with the drive line to the row of cores.

A core driver circuit 38 provides an output signal on lead 39 which is in circuit with each of the switches 30–35 for driving the cores 21 in one of the rows driven by a signal on the row drive line to which a corresponding switch 30–35 is closed. The sequential closing of the switches 30–35 is controlled by the control circuit 40 which produces a control signal on channel 41. The channel 41 comprises a plurality of conductors 41*a* through 41*f* for sequentially closing each of the switches 30–35. In the preferred embodiment each of the switches is a high speed silicon transistor which is activated by a pulse on its associated control lead provided from the control circuit 40. The pulses are provided on leads 41*a* through 41*f* serially so that the output from the cores along any row may be sequentially sensed. For example, the switch 30 is first closed by a signal on line 41*a*. When the switch 30 is opened, the switch 31 is closed by a signal on lead 41*b*, and so forth. Each of the row drive lines 23–28 terminates at a common lead 43 which is connected to a second terminal at the output of the core driver 38 to complete circuit a closed circuit any of the switches 30–35 is closed.

In a manner similar to the arrangement of drive lines and switches provided for the cores along rows *a* through *f*, a plurality of drive lines 44–49 are respectively threaded through each of the cores 21 located in one of the columns m through *r*. The column drive lines 44–49 are respectively connected through switches 50–55 to the lead 39 from the core driver circuit 38.

The control signals for the sequential actuation of the switches 50–55 are provided on a channel 57 from the control unit 40. The channel 57 includes a plurality of lines 57*m* through 57*r* for operating the switches associated with the drive lines 44–49 in the plurality of columns. For example, after switch 35 has been closed and subsequently opened by a signal on line 41*f*, the switch 50 is closed by a signal on the line 57*m*. When the switch 50 is opened, the switch 51 is closed by a signal on line 57*n* and so forth. Each of the column drive lines 44–49 also terminates at line 43 which is connected to the core drive circuit 38.

A sense line 60 is provided for sensing the signals on any of the cores 21 when columns of cores are being driven. The line 60 is interlaced through row *a* in a first direction (toward the left in FIG. 3) and through row *f* in a second or opposite direction (toward the right in FIG. 3). The line 60 passes through row *b* again in the first direction and through the cores in row *e* again in the second or opposite direction. The line 60 again is threaded through row *c* in the first direction and through row *d* again in the opposite direction to be connected to the common line 62 at a terminal 61. The line 62 is connected to a terminal of the output amplifier 63. In this manner, all of the cores 21 in rows *a*, *b*, and *c* are threaded by the sense line 60 in a first direction, while all of the cores 21 located in rows *d*, *e*, and *f* are threaded by the sense line 60 in a second or opposite direction.

A second sense line 64 is provided for sensing the signals on any of the cores 21 when the rows of cores are being driven. The second sense line 64 interlaces the cores in column *m* through *r* in a manner similar to the interlacing of the sense line 60 in rows *a* through f. The second sense line 64 is threaded through all of the cores 21 in column *p* in a first direction. The sense line 64 threads all of the cores 21 in row *o* in a second, or opposite direction, and thereafter threads all of the cores 21 in column *q* in the first direction, all of the cores in column *n* in the second direction, all of the cores 21 in column *r* in the first direction, and all of the cores 21 in column *m* in an opposite direction and is connected at terminal 61 to lead 62.

Thus, all of the cores 21 in columns *p*, *q*, and *r* are threaded in a first direction, while all of the cores in columns *n*, *m*, and *o* are threaded in a second or opposite direction.

With all of the cores 21 in the matrix 20 oriented in the same direction, drive pulses of a given polarity will produce a sense signal of one polarity in the cores 21 threaded in one direction and a sense signal of the opposite polarity in the cores threaded in the opposite direction when no external force is applied to any of the driven cores. When the number of driven cores threaded by either the sense line 60 or the sense line 64 in one direction is equal to the number of driven cores threaded by either sense line the opposite direction, the net signal on either sense line is substantially equal to zero volts because the signals produced are self-cancelling. When a force is applied to a core, however, its output is reduced, as shown in FIG. 2, so that the net signal is no longer zero, but rather is a signal having a magnitude directly related to the force on the core. The resultant polarity of the non-zero resultant signal will depend upon whether the core is sensed by a sense line in a first or a second direction.

A switch 70 connected to an input of the output amplifier 63 controls which sensing signal from either lead 60 or lead 64 is applied to the input of the amplifier 63. The switch 70 is controlled by a lead shown in phantom designated by the reference numeral 71 from an output terminal 72 of the control circuit 40. The switch 70 is coordinated so that when the rows *a* through *f* of cores 21 are being driven by the closing of switches 30–35 respectively, the sensing signal on line 64 is applied to the input of amplifier 63 for switch 70 in the position shown. On the other hand, when the columns *m* through *r* of cores 21 are being driven by the closing of switches 50–55 respectively, the sensing signal on line 60 is provided to the input of amplifier 63.

In the absence of a force applied to any one of the cores 21 in the matrix 20, no resultant input signal will be provided to the amplifier 63 from either the row sensing line 60 or the column sensing line 64. This occurs because the resultant signal on the sense line is zero as described above and because of the coordination of the sensing signal applied to the output amplifier 63 through switch 70 from either line 60 or 64. By way of example, suppose that the switch 30 is closed from a signal on channel 41 from the control circuit 40, so that the signal on drive line 23 thus drives all of the cores 21 in row *a* of the matrix 20. Since the line 64 senses the signal from the cores in row *a*, columns *p*, *q*, and *r*, in one direction and from the cores in row *a*, columns m, n, and *o*, in the opposite direction, and all of the cores in row *a* are oriented in the same direction, the resulting signal on the sensing line 64 is zero. That signal is applied to the amplifier 63 for switch 70 positioned as shown. Similarly, when the switch 50, for example, is closed to drive all of the cores in column *m*, switch 70 changes position to admit signals appearing on line 60 to the amplifier 63. Since the sensing line 60 threads the cores in column *m*, switch 70 changes position to admit signals appearing on line 60 to the amplifier 63. Since the sensing line 6 threads the cores in column *m*, rows *a*, *b*, and *c*, in a first direction and the cores in column *m*, rows *d*, *e*, and *f*, in a second direction, the resulting signal which appears on sensing line 60 is similarly zero.

However, when a force is applied to a core 21 in the matrix 20, the output from the pressured core is reduced in accordance with FIG. 2. Thus, the cumulative or algebraic sum of the signals appearing on either line 60 or 64 is a signal other than zero as described above when the switches to the particular row or column containing the pressured core are closed. By way of example, assume that a force, for example from a pencil point of about 1,500 grams, is applied to the core $21_{dp}$, i.e., the core 21 which is contained in row *d*, column *p*. As switches 30, 31, and 32 are sequentially closed by the action of the control circuit 40 through signals on lines 41*a*, 41*b* and 41*c*, no signal appears on the sensing line 64 since the outputs of the driven cores in rows *a*, *b*, and *c* are self-cancelling. However, when switch 33 is closed by a signal on lead 41*d*, and all of the cores in row *d* are driven, a signal appears on line 64 since the sensed output from core $21_{dp}$ is substantially less than the outputs of the remaining cores in row 21*d*. Thus, while the magnitude of the signals produced by cores $21_{dm}$ and $21_{dn}$ is sufficient to cancel the outputs produced by cores $21_{dq}$ and $21_{dr}$ since no pressure is applied to any of these cores, the output produced by the unpressured core $21_{do}$ is greater than the output on the pressured core $21_{dp}$ so that a signal is produced on sensing line 64. of For the examples shown in FIG. 2, and assuming a current drive on the order of 2.0 amps, the net signal produced on the line 64 is on the order of 200 millivolts, assuming that an unpressured core produces a signal of about 260 millivolts, while the pressured core produces a signal of about 60 millivolts. In addition, as illustrated in FIG. 2, the magnitude of the signal on line 64 depends upon the pressure applied to the particular core. Similarly, as switches 34 and 35 are sequentially closed to complete the drive sequence for the rows of cores, no signal again appears on line 64.

In the preferred embodiment, the output signal from the amplifier 63 is provided on line 74 to the control circuit 40 which provides a signal on line 75 to stop the X-counter circuit 76 when a signal appears on line 74. Thus, for the simplified example of FIG. 3, for pressure applied to the core $21_{dp}$, the X-counter 76 is stopped by a signal on line 75 when the fourth row or row *d* is driven by the closing of switch 33. It should be understood that, in a physical embodiment, a vast number of cores are contained in the matrix, but that the principles of the counting technique are equally applicable to any number of cores. In the specific embodiment illustrated in FIG. 3, a count of 4 in the X-counter 76 indicates that the pressured core is contained in row *d*.

After switch 35 is opened to complete the row driving sequence, the switches 50 through 55 are respectively closed by signals on lines 57*m* through 57*r* from the control circuit 40. As switches 50, 51, and 52 are closed, no signal appears on line 60 since the resultant output from columns *m*, *n*, and *o* is substantially zero in the manner previously discussed. However, when switch 53 is closed by the signal on line 57*p*, a signal appears on line 60 because the output of core $21_{dp}$ is reduced by the application of pressure to that core. In that event, a signal is produced on line 60 which causes the control circuit 50 to provide a signal on line 68 to stop the Y-counter 79 indicating a count of 4. That count indicates that the driven core is in column *p*, or the fourth column driven by a signal on channel 57 from the control circuit 40. Thus, the count recorded in the X-counter 76(4) and the Y-counter 79(4) indicates the precise location of the pressured core, in this case 4, 4, indicating that the pressured core is in the forth row which is driven and the fourth column which is driven, i.e. the core $21_{dp}$.

The output produced when a core is pressured on line 60 and 64 will vary depending upon the position on the stylus 12 relative to the pressured core. The maximum output results over an area approximately equal to the square of the core width, which, in the preferred embodiment, is about 6 mils. The use of a wider stylus 12 increases the effective area in the matrix which would produce a maximum output. In the embodiment in FIG. 3, assuming that the cores 21 are spaced about 20 mils on center, areas of reduced sensitivity occur between adjacent cores. Assuming that the stylus is positioned in row d between adjacent cores $21_{dp}$ and $21_{dq}$. but closer to $21_{dp}$. the operation of the circuit proceeds as previously described, since the initial output sensed from the output amplifier occurs when the fourth column *p* is driven. Even if the stylus were located closer to core $21_{dq}$. the circuit would operate as previously indicated. In order to increase the sensitivity of the circuit, the output amplifier 63 could be made sensitive to a particular signal level such that the output from core $21_{dp}$ would not provide a signal on line 74 to stop the X and Y-counters until the appropriate switches had been closed to sense the larger signal from core $21_{dq}$.

In the embodiment of FIG. 3, potentially uncertain positions are shown by the orthogonal lines of uncertainty designated respectively by the numeral 81 and 82. The orthogonal lines of uncertainty appear at the midpoints of the rows and columns of the matrix. Thus, when a stylus 12 is precisely located on the uncertain line 81, the effect produced by the force on column *o* cancels the effect produced on the core in column *p* so that the resulting output in line 60 is zero. Similarly, if the stylus is positioned on the uncertain line 82, the effect produced on row *c* is equal and opposite to the effect produced in row *d* and again the circuit is unable to indicate the position of the stylus. The width of the lines 81 and 82 of uncertainty is small and is determined for any specific combination of cores, core encapsulation, pad and stylus shape.

If the lines of uncertainty 81 and 82 cannot be tolerated in a specific embodiment, only a given quadrant of the matrix 20 may be used in the manner previously discussed since there are no potentially uncertain lines in any given guadrant.

FIG. 5 is a graph showing the variation of the output on a sense line 60 or 64 as a function of the location of the applied force relative to the cores 21. The curve designated by the reference numeral 85 is produced by a force of lesser magnitude than the force producing the output designated by the reference numeral 84, in accordance with the teachings of FIG. 2. As shown, the maximum output is produced by an application of force substantially directly upon the core 21; whereas the magnitude of the output is reduced to a local minimum, designated by the reference numeral 86, between adjacent cores. If, in a specific embodiment, the null position identified by the vertical dot-dashed line corresponding to a line of uncertainty (e.g., line 81, FIG. 3) cannot be tolerated, all of the cores in a row could be oriented alike and threaded in the same direction and an external cancellation voltage provided to each line, for example, from a transformer. Thus, in this alternatiVe embodiment, the zero output would be produced by the sum of the outputs of the cores in a given row, and, in the absence of force, would be precisely cancelled by the output from the cancelling voltage.

Figure 4:
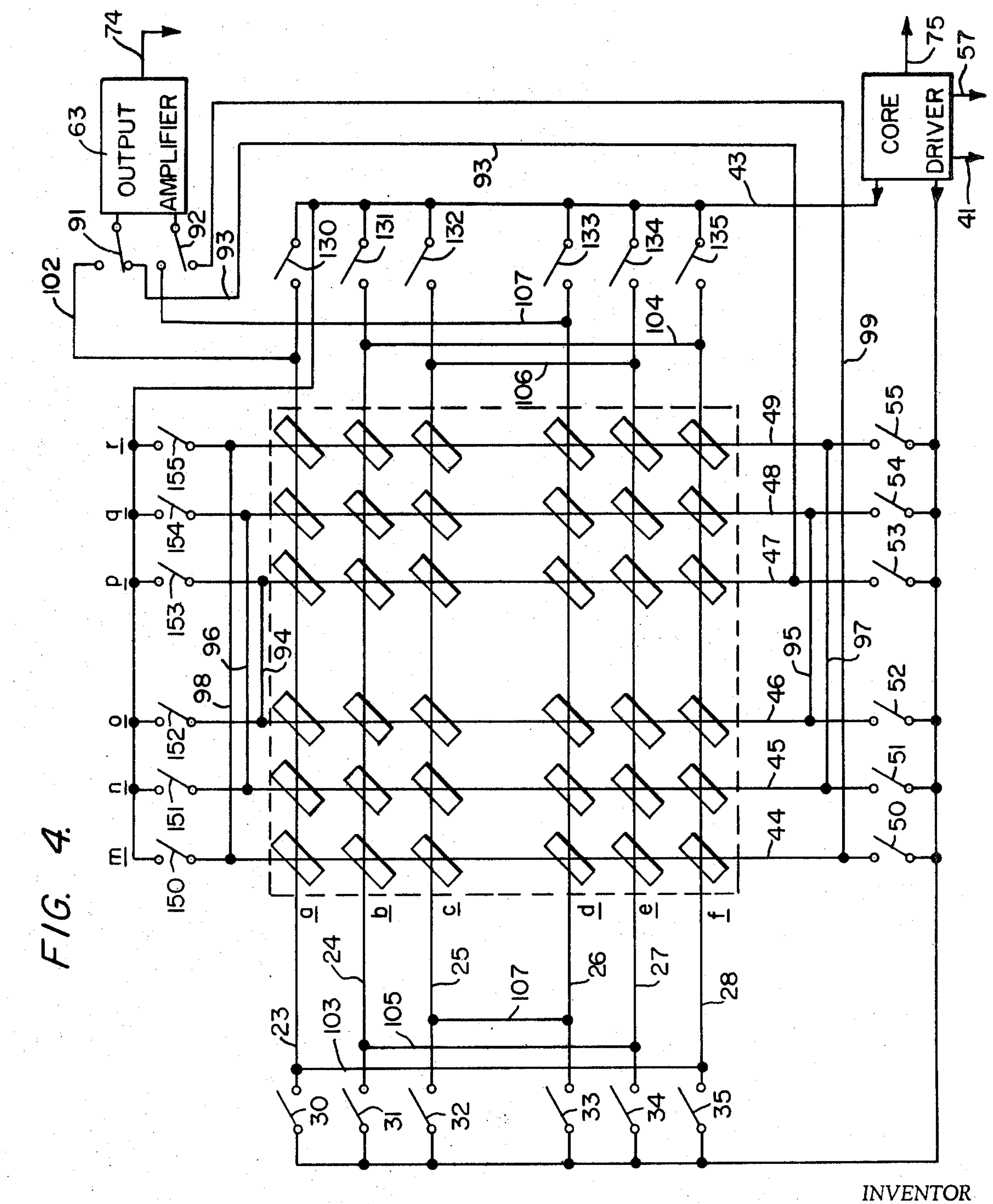
FIG. 4 is a circuit diagram of another embodiment of the invention which is similar to FIG. 3 but which uses the column drive lines as sense lines when the rows of cores are sequentially driven and the row drive lines as senses lines when the columns of cores are sequentially driven.

FIG. 4 is an alternative embodiment of the circuit shown in FIG. 3 which utilizes switches in the drive lines in each row and in each column so that only a single lead is threaded through each cores 21 in each direction. Circuit elements in FIG. 4 which correspond to those previously described in connection with FIG. 3 are identified with like reference numerals. The control circuit 40, the X-counter 76 and Y-counter 79 together with their associated lines are not reproduced in FIG. 4, but are included therewith and operate as discussed in connection with FIG. 3.

A plurality of switches 130–135 are connected in circuit with the drive lines 23–28 in rows *a* through *f* of the matrix 20, while switches 150–155 are connected in circuit with the drive lines 44–49 in rows *m* through *r*. Each of the switches 130–135 and 150–155 are also driven by an output signal on channels 41 and 57 respectively. Thus, when switch 30 is closed, switch 130 is also closed, while when switch 50 is closed, switch 150 is closed and so forth.

The advantage of FIG. 4 is when switches 30–35 and 130–135 are closed sequentially driving the cores in the rows *a* through *f* by a signal on lines 23–28, the drive lines 44–49 for columns *m* through *r* serve as the sensing lines for a signal produced by any of the cores in rows *a* through *f*. A switch 91, in circuit with the input of the output amplifier 63 is connected to line 93 which is connected to the column drive line 47. The line 47 is connected by line 94 to the drive line 46 which is connected in circuit to the line 48 which is connected by a line 96 to the column drive line 45 which is in turn connected by a line 97 to the vertical drive line 49. The vertical drive line 49 is connected by a line 98 to the line 44 which is connected to a switch 92 at the input of the output amplifier 63 by a line 99. The effect of these circuit connections is to utilize the column drive lines 44,45 and 46 to sense the outputs of the cores in column *m*,*n*, and *o* in a first direction and to sense the outputs of the cores in columns *p*,*q*, and *r*, in a sensed direction for the case of the cores 21 being driven on a row by row basis by the closing of switches 30–35 and 130–135 respectively. In operation, the circuit proceeds in a manner described in connection with FIG. 3.

When the horizontal drive cycle is completed after the closing and subsequent opening of switches 35 and 135, the vertical drive cycle proceeds to close switches 50–55 and 150–155 respectively. As previously indicated, switch 150 closes when switch 50 closes, switch 151 closes when switch 51 closes, and so forth. In this instance, switches 91 and 92 at the input of amplifier 63 change position, and the horizontal drive lines 23–28 act as sense lines. Thus, the switch 91 is connected by line 102 connected to line 23, and line 23 connected by line 103 to the horizontal drive line 28. The horizontal drive line 28 is connected by line 104 to the horizontal drive line 24 which in turn is connected by line 105 to the horizontal drive line 27. The line 27 is connected by lead 106 to the horizontal drive line 25 which is in turn connected by line 107 to the horizontal drive line 26 which in turn is connected to switch 92 on line 107. In this manner, horizontal drive lines 23 thread the cores in columns *a*, *b*, and *c* in one direction, while lines 26, 27 and 28 thread the cores 21 in rows *d*, *e*, and *f* in the second direction. Thus, in the absence of the force applied to any one of the cores 21, the signal applied to the input of the output amplifier is cancelled and no output is provided. When a force is applied to one of the cores, the circuit operates as described in accordance with FIG. 3.

Thus, circuits which may be used for digitally identifying the location of applied force by utilizing a change in the output from a magnetic core as a function of the force applied to the core have been described.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An apparatus for indicating the location of an applied force comprising the combination of:

a ferromagnetic core which exhibits a change in a sensed output signal responsive to a drive signal applied to said core wherein said change is a function of a force applied to said core, means for sensing the change in the sensed output signal including circuit means in combination with said core which provide a neutralizing signal substantially equal in magnitude to the sensed signal produced by said core when influenced by a first force, and indicating means responsive to said sensing means to indicate that force has been applied to indicate the location of said force, said circuit means being arranged so that said indicating means is responsive to a sensed output signal from said core when a second force which is different from said first force is applied to said core.

2. The apparatus as set forth in claim 1 wherein said indicating means is responsive to the difference between the sensed output signal from said core when said core is influenced by said second force and the signal representing the difference between the sensed output signal from said core when influenced by said first force and said neutralizing signal.

3. The apparatus as set forth in claim 2 wherein said apparatus includes a second core which exhibits a change in a sensed output signal responsive to a drive signal applied to said second core wherein said change is a function of a force applied to said second core, said second core being arranged so that said second core when influenced by a force substantially equal to said first force produces a sensed output signal in response to a drive signal applied to said core which is substantially equal in magnitude to the sensed output signal from said first core when influenced by said first force.

4. The apparatus as set forth in claim 3 wherein said indicating means includes means for digitally coding the location of said force.

5. The apparatus as set forth in claim 3 wherein said second force is produced by a stylus which exerts a force on said first core.

6. An apparatus for indicating the locations of an applied force comprising the combination of:

a matrix of magnetic cores arranged in rows and columns of said cores wherein each of said cores exhibits a change in the sensed output signal from a core responsive to a drive signal applied to said core wherein said change is a function of a force applied to said core, means for driving selected ones of the cores in said matrix in a predetermined sequence with a drive signal, means for sensing the output signal of the cores in said matrix, the sensed output signal being responsive to said drive signal, the net output signal sensed by said sensing means from the selected ones of said cores which are driven by a drive signal from said drive means being substantially zero when each of said elected ones of said cores is subjected to substantially the same force, and indicating means responsive to said sensing means to indicate that a force has been applied to at least one of said cores in said matrix and to indicate the location of said force.

7. An apparatus for indicating the location of an applied force comprising the combination of:

a matrix of magnetic cores arranged in rows and columns of said cores wherein each of said cores exhibits a change in a sensed output signal from a core responsive to a drive signal applied to said core wherein said change in a function of a force applied to said core, means for driving selected ones of the cores in said matrix in a predetermined sequence with a drive signal, means for sensing the output signal of the cores in said matrix, the sensed output signal being responsive to said drive signal, a net output signal being sensed by said sensing means from the selected ones of said cores which are driven by a drive signal from said drive means when at least one of the cores is subjected to a force different from the force applied to the remaining cores of said selected ones of said cores, and indicating means responsive to said sensing means to indicate that a force has been applied to at least one of said cores in said matrix and to indicate the location of said cores.

8. The apparatus as set forth in claim 7 wherein said driving means sequentially drives each of a plurality of selected ones of said cores in said matrix.

9. The apparatus as set forth in claim 8 wherein said indicating means is responsive to said net output signal to indicate that one of said selected cores in said plurality of selected ones of said cores is influenced by a force different from the force applied to others of the driven cores.

10. The apparatus as set forth in claim 8 wherein said indicating means digitally codes the location of a core in said matrix which is influenced by said different force.

11. The apparatus as set forth in claim 9 wherein said driving means for a first plurality of selected ones of said cores comprises a portion of said sensing means for a second plurality of said selected ones of said cores.

12. The apparatus as set forth in claim 11 wherein said matrix comprises a plurality of rows of cores and a plurality of columns of said cores and wherein the means for driving a row of cores serves as a portion of the means for sensing the sensed output from a column of cores when driven.

13. A method for locating an applied force on a magnetic material which exhibits a change in the sensed output signal responsive to a drive signal applied to said magnetic material wherein said change is a function of a force applied to said magnetic material comprising the steps of:

sensing the change in the sensed output signal;

providing a neutralizing signal substantially equal in magnitude to the sensed output signal produced by said core by a first force;

and indicating both that a force has been applied to the magnetic material and the location of the force by responding to a second output signal from said core when a second force which is different from said first force is applied to said magnetic material.

14. The method as set forth in claim 13 wherein the step of providing a neutralizing signal is further defined in that said neutralizing signal is provided from a second core which exhibits a change in a sensed output signal responsive to a drive signal applied to said second core wherein said change is a function of a force applied to said second core.

15. The method as set forth in claim 14 wherein the step of indicating includes the step of digitally locating said force.

16. The method for indicating the location of a force on a matrix of magnetic cores arranged in rows and columns wherein each of said cores exhibits a change in the sensed output signal from a core responsive to a drive signal applied to said core wherein said change is a function of a force applied to said core comprising the steps of:

driving selected ones of the cores in said matrix in a predetermined sequence with a drive signal, sensing the output signal from the selected ones of said cores in said matrix which are driven by a drive signal when at least one of the cores is subjected to a force different from the force applied to the remaining cores of said selected ones of said cores, and indicating that a force has been applied to at least one of said cores in said matrix and to indicate the location of said force.

17. The method as set forth in claim 16 wherein the step of driving includes the step of sequentially driving each of a plurality of selected ones of said cores in said matrix.

18. The method as set forth in claim 17 wherein the step of indicating includes the step of responding to said net output signal by indicating that one of said selected cores in said plurality of selected ones of said cores is influenced by a force different from the force applied to others of the driven core.

19. The method as set forth in claim 18 wherein the step of indicating includes the step of digitally coding the location of a core in said matrix which is influenced by said different force.

20. The method as set forth in claim 19, wherein the step of driving includes the step of selecting ones of said cores to comprise a portion of said sensing means for a second plurality of said selected ones of said cores which are driven.

21. The method as set forth in claim 20 wherein the matrix comprises a plurality of rows of cores and a plurality of columns of said cores and wherein the step of driving includes the step of using a row of cores as a portion of the apparatus which senses the sensed output from a column of cores when driven.

22. Apparatus for indicating the location of an applied force comprising the combination of:

a matrix of ferro-magnetic cores arranged in rows and columns, each core exhibiting an analog change in magnetic properties in accordance with the magnitude of a force applied to said core;

means for providing a sensed output from each individual core, said sensed output varying in accordance with said magnetic properties of the corresponding core;

matrix circuit means for providing coordinate outputs corresponding respectively to rows and columns of said cores, said circuit means being arranged such that the output for each row or each column represents the difference between the combined outputs of two sets of cores in the corresponding row or column and, when the forces applied to said sets of cores are balanced, said coordinate output is in a null condition; and means responsive to said coordinate outputs for digitally indicating the location of said applied force.

23. Apparatus for indicating the location of an applied force comprising the combination of:

a matrix of pressure-responsive ferro-magnetic cores arranged in columns and rows, said matrix being divided into four sections by first and second intersecting reference lines;

means for providing a sensed output from each core, said sensed output being responsive in an analog fashion to the application of force to the corresponding core;

matrix circuit means for providing coordinate analog outputs corresponding respectively to rows and columns of said cores, said circuit means being arranged such that the output for each row represents the difference between the combined sensed outputs from cores lying on opposite sides of said first reference line, and the output for each column represents the difference between the combined sensed outputs from cores lying on opposite sides of said second reference line, and, when the forces applied to said cores in a row or column are balanced on either side of said first or second reference line respectively, said coordinate output is in a null condition; and means responsive to said coordinate outputs for indicating the location of said applied force.

* * * * *